Figure 1:
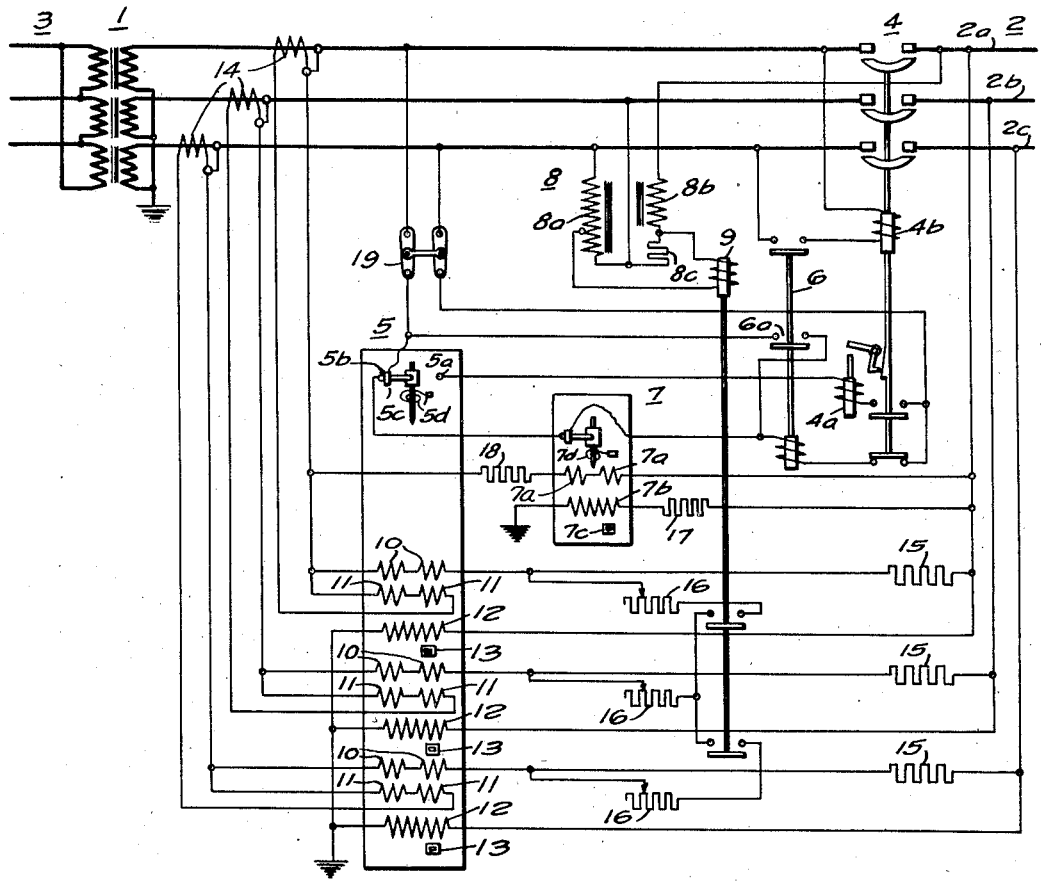

June 16, 1936.  M. A. BOSTWICK  2,044,148

NETWORK PROTECTOR

Filed March 22, 1934  2 Sheets-Sheet 1

WITNESSES:

INVENTOR
Myron A. Bostwick
BY
ATTORNEY

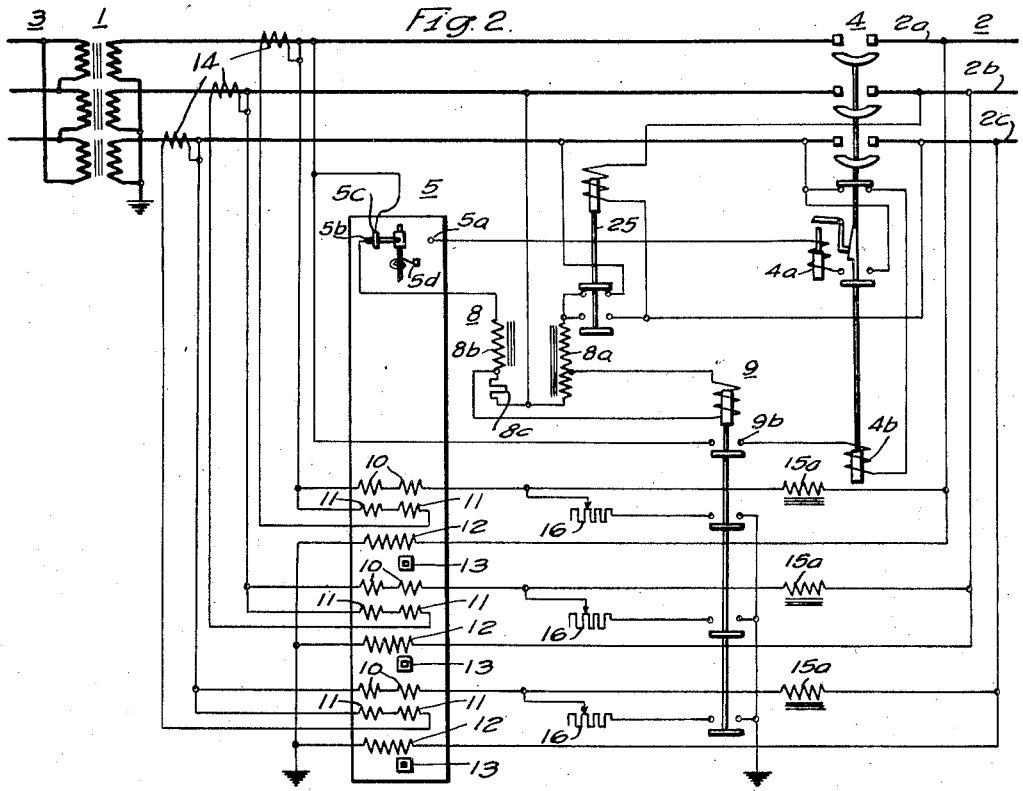

Patented June 16, 1936

2,044,148

UNITED STATES PATENT OFFICE 2,044,148

NETWORK PROTECTOR

Myron A. Bostwick, North Arlington, N. J., assignor to Westinghouse Electric & Manufacturing Company, East Pittsburgh, Pa., a corporation of Pennsylvania Application March 22, 1934, Serial No. 716,819

11 Claims. (Cl. 175—294)

My present invention is a continuation-in-part of my copending application, Serial No. 630,356, filed August 25, 1932 and issued April 24, 1934 as U. S. Patent No. 1,955,940 assigned to the Westinghouse Electric & Manufacturing Company.

My invention relates to alternating-current systems of transmission and distribution and particularly to polyphase systems of the network type.

It is an object of my invention to provide a novel method and means for establishing connections between a pair of polyphase alternating-current circuits under conditions of approximate synchronism.

Another object of my invention is to provide a novel network protector in which the closing or phasing operation may be performed by means of simplified apparatus.

A further object of my invention is to provide a novel method of and apparatus for connecting a pair of polyphase circuits under conditions of approximately normal voltage relationship.

In accordance with the method of my invention, I create an artificial polyphase voltage system which has the same vector dimensions as the polyphase voltages of the circuits and which includes at least one voltage derived from each of the circuits. The voltage system thus created is treated as an entity, and some property or dimension of it is measured as an index of the degree to which the voltage system approaches an arbitrary standard of normality. Although various properties or dimensions are suitable as a standard, I prefer to utilize the dimension known in the art as the positive symmetrical component, or the positive sequence voltage of the voltage system, as the arbitrary guide upon which the measurement of normality is based. When the selected dimension falls within the arbitrary range of values assumed as normal, the circuits are connected.

The method of my invention differs from the methods of the prior art, principally, in that no comparison is made of a phase voltage of one of the circuits and the corresponding phase voltage of the other circuit. So far as I am aware, all analogous methods of the prior art have involved some form of comparison of voltages of like phase of the two circuits, as by measurement of a vector product, measurement of absolute difference, or a comparison of derived quantities such as torques or magnetomotive forces.

Other objects of my invention will become evident from the following detailed description taken in conjunction with the accompanying drawings in which Figure 1 is a diagrammatic view of a network protector embodying my invention.

Fig. 2 is a diagrammatic view of a modification of the network protector shown in Fig. 1; and Fig. 3 is a diagrammatic view of a simplified network protector embodying my invention.

Referring to Fig. 1 in detail, a transformer bank 1, which may be one of a number of similar banks for supplying power to a distribution network 2, is connected between a feeder 3 and one side of a protector circuit breaker 4. I have illustrated the primary windings of the transformer bank 1 connected in delta to the feeder 3 and the secondary windings connected in star with neutral grounded, but it will be understood that my invention may be practiced with other connections known in the art. The circuit breaker 4 is connected between the secondary windings of the transformer bank 1 and the conductors 2a, 2b and 2c of the network 2.

The circuit breaker 4 is provided with a trip mechanism of any suitable type, which I have illustrated as a shunt trip coil 4a, and with a closing motor or coil 4b. The trip coil 4a is controlled by means of a tripping contact member 5a and a movable contact member 5c of a power-directional master relay indicated diagrammatically at 5. The closing coil 4b of the circuit breaker 4 is controlled by means of a closing relay 6.

The operating coil of the closing relay 6 is connected in a circuit which includes a closing contact member 5b of the relay 5, and contact members of a phasing relay 7. In addition to contact members for controlling the closing coil 4b of circuit breaker 4, the closing relay 6 is provided with a set of contact members 6a for completing a holding circuit for itself independent of directional relay 5 and the phasing relay 7.

A phase sequence filter 8 is connected to be energized in accordance with a polyphase system of voltages derived in part from the transformer bank 1 and in part from the network 2. To this end, two terminals of the voltage filter 8 are connected to secondary terminals of the transformer bank 1, and the remaining terminal is connected, on the network side of the circuit breaker 4, to the network conductor corresponding to the remaining phase.

A voltage responsive relay 9 for controlling a set of restraining connections for the power-directional relay 5, as will be hereinafter more fully described, is connected to output taps of the phase-sequence filter 8 to respond to a positive symmetrical voltage component.

The phase-sequence filter 8 is preferably of the type disclosed in U. S. Patent No. 1,936,797 of B. E. Lenehan, issued November 28, 1933 and assigned to the Westinghouse Electric & Manufacturing Company. This filter comprises an auto-transformer 8a, having a tap to provide a voltage less than half the total voltage impressed on the auto-transformer, for example a 40% tap, and an impedance consisting of a reactor 8b and a resistor 8c having a combined lagging phase angle of 60°. Assuming that the phase rotation of the secondary voltages of the transformer bank 1 is as indicated by the subscripts a, b and c of the network conductors 2a, 2b and 2c, the coil of the voltage responsive relay 9 is subject to a voltage equal to the vector sum of 40% of the voltage between the b and c phase transformer secondary terminals and a voltage equal to 40% of the voltage between the b-phase transformer secondary terminal and the a-phase network conductor 2a, but lagging the latter voltage by a phase angle of 60°.

As the network 2 is supplied by additional transformer banks (not shown) having grounded neutral points, the polyphase voltages on both sides of the open circuit breaker 4 are referred to ground when the transformer 1 and the network 2 are energized. The filter 8 is, accordingly, energized by a polyphase voltage system consisting of the a phase voltage of the network 2 and the b and c phase voltages of the transformer bank 1. As explained in the above-mentioned patent of B. E. Lenehan, when the filter 8 is energized by a polyphase voltage having the indicated sequence of phases, a positive symmetrical component is segregated and applied to an electroresponsive device corresponding to the relay 9.

The voltage-responsive relay 9 is designed to close when the positive symmetrical components of transformer secondary voltage exceed a predetermined value, for example, 95% of the normal balanced network voltage, and to drop out when the positive symmetrical components fall below a predetermined minimum value, for example 85% or 90% of the normal balanced network voltage.

The power directional relay 5 is preferably of the polyphase induction-disc type described in the co-pending application of John S. Parsons, Serial No. 627,083, filed July 30, 1932 and issued September 11, 1934 as U. S. Patent No. 1,973,097 assigned to the Westinghouse Electric & Manufacturing Company. This relay is provided with three independent driving magnets (not shown), upon each of which are mounted a pair of phasing windings 10, a pair of current windings 11 and a potential winding 12, in a well known manner.

The power-directional relay 5 is provided with a spring 5d for biasing the movable contact member 5c into engagement with the closing contact member 5b when the potential windings 12 are deenergized. An over-voltage adjusting loop indicated diagrammatically at 13 is associated with each of the potential windings 12 to overcome the biasing torque of the spring 5d and bias the movable contact member 5c out of engagement with the closing contact member 5b, when the potential windings 12 are energized, as explained in the copending application of John S. Parsons, mentioned above.

The current windings 11 of the relay 5 are connected to be energized by means of a set of current transformers 14 in accordance with the phase currents of the secondary windings of the transformer bank 1.

The phasing windings 10 of the relay 5 are used to obtain a restraining torque and are connected in series with suitable phasing impedance elements 15, which I have illustrated as phasing resistors, across the main contact members of the circuit breaker 4.

The potential windings 12 of the relay 5 are connected between the corresponding phase conductors 2a, 2b and 2c of the network 2 and ground, to respond to the network star voltages in the usual manner.

The three groups of current windings 11 and potential windings 12 are connected in such relative directions that when balanced power flows from the transformer bank 1 to the distribution network 2, the torque of each group tends to maintain engagement of the movable contact member 5c and the closing contact member 5b. When balanced power flows from the network 2 to the transformer bank 1, the torque produced by each of the groups of current and potential windings tends to rotate the movable contact member 5c out of engagement with the closing contact member 5b and into engagement with the tripping contact member 5a.

The phasing windings 10 are connected in such relative directions, as compared with the potential windings 12, that when the circuit breaker 4 and the voltage responsive relay 9 are open and the distribution network 2 is energized from other transformer banks (not shown) the torque of each of the groups of potential and phasing windings tends to cause engagement of the movable contact member 5c and the closing contact member 5b if the transformer secondary voltage is in phase with the network voltage and exceeds the network voltage by more than a predetermined amount, such as a fraction of a volt. If the component of transformer secondary voltage in phase with the network voltage fails to exceed the network voltage by the predetermined amount mentioned above, the movable contact member 5c of the relay 5 is maintained out of engagement with the closing contact member 5b. However, as will be explained more fully hereinafter, the actual phasing operation is not controlled by the power directional relay 5 but by the voltage-responsive relay 9.

The restraining connections for the power-directional relay 5, mentioned above, comprise impedance elements 16 which I have illustrated as adjustable resistors, connected between the junction points of the phasing windings 10 and the corresponding phasing resistors 15, and an artificial neutral point formed by the contact members of the voltage responsive relay 9. It will be noted that upon closure of the voltage responsive relay 9, a three-phase potentiometer is formed for applying a voltage component to each of the phasing windings 10.

The phasing relay 7 is preferably of the single element induction disc type. The windings of this relay comprise a pair of phasing windings 7a and a potential winding 7b, mounted upon a driving magnet (not shown) in the usual manner. A pair of impedance elements 17 and 18, which I have illustrated as resistors, are included in the phasing and potential circuits of the phasing relay 7, for rotating the closing characteristic of the relay counterclockwise through an angle approaching 90°, in a well known manner to provide anti-pumping characteristics. The phasing relay 7 is provided with a spring 7d and an overvoltage adjusting loop 7c for the same purpose as the corresponding elements of the power-directional relay 5.

A manually operated switch 19 is provided for opening the control circuits of the protector for testing.

The operation of the apparatus shown in Fig. 1 may be set forth as follows. It is assumed that initially the distribution network 2 and the feeder 3 are deenergized and the various relays and switches of the protector are in the positions shown in the figure.

If the feeder 3 is first energized, the transformer bank 1 develops a secondary voltage, but as the circuit breaker 4 is open no current flows in the secondary windings of the transformer bank 1. The voltage of each phase of the secondary windings of the transformer bank 1 is now impressed on a circuit which includes the phasing winding 10 for the corresponding phase, a phasing resistor 15 and the corresponding potential winding 12. If no translating devices are connected to the dead network 2, the current in each of the phasing windings 10 is in phase with the current in the corresponding potential winding 12, and the torque exerted in the relay 5 is quite small because of the quadrature space displacement of the phasing and potential windings. If any translating devices are connected to the dead network 2, as is usually the case, they act as a short-circuit for the comparatively high impedance potential windings 12 and in this way prevent the relay 5 from developing an appreciable torque. In either case, therefore, the biasing spring 5d acts substantially unopposed to maintain engagement of the movable contact member 5c and the closing contact member 5b of the relay 5. Similar considerations apply to the phasing relay 7, and the biasing spring 7d of the latter relay maintains engagement of the phasing relay contact members.

As the network 2 is dead, the a-phase voltage of the polyphase voltage system applied to the filter 8 is zero, and the positive symmetrical components of the polyphase system are below 95% of normal value. The voltage responsive relay 9 accordingly remains open. However, the closing contact members of the power directional relay 5 and of phasing relay 7 are closed, and a circuit for the closing relay 6 is completed. The closing relay 6 closes to complete a holding circuit for itself through the contact members 6a and to complete a circuit for the closing coil 4b of the circuit breaker 4.

In response to energization of the closing coil 4b of the circuit breaker 4 by the closing relay 6, the circuit breaker 4 closes and is latched in. The circuit breaker 4, in closing, energizes the network 2, the potential windings 12 of the relay 5 and 7b of the relay 7, and the a-phase connection of the voltage filter 8.

The full polyphase secondary voltage of the transformer bank 1 is accordingly applied to the filter 8, and the voltage responsive relay 9 closes. Upon closure of the relay 9, a voltage is applied to each of the phasing windings 10, because of the potentiometer connection of the windings 10 and the resistors 15 and 16 between the secondary terminals of the transformer bank 1 and the artificial neutral point formed by the contact members of the relay 9. Because of the energization of the phasing windings 10 in this manner, a strong biasing or restraining torque is exerted in the relay 5 which maintains the movable contact member 5c firmly in engagement with the closing contact member 5b.

Upon energization of the potential winding 7b, by closure of the circuit breaker 4, the overvoltage adjusting loop 7c acts to produce a biasing torque in the phasing relay 7 which overcomes the torque of the spring 7d and causes the contact members of the relay 7 to open. As the relay 6 is energized through a holding circuit independent of the phasing relay 7, however, the relay 6 remains closed. Because of the large magnitude of the restraining torque in the power directional relay 5, the overvoltage loops 13 do not develop sufficient torque to effect separation of contact members 5b and 5c, and the relay 5 remains strongly biased to the closing position.

The relay 5 now acts as a power-directional relay with insensitive setting. By adjusting the resistors 16, the restraining torque produced in the relay may be adjusted to suit the requirements of the application in which the protector is used.

If a fault occurs on the network 2, it is burned clear in the usual manner. If, because of a network fault comparatively close to the circuit breaker 4, the voltage at the protector is reduced to such a value that the voltage-responsive relay 9 drops out, the circuit breaker 4 nevertheless remains closed because the direction of power flow is normal.

If a fault occurs on the feeder 3, the direction of power flow reverses and a considerable reduction of voltage of one or more phases occurs, depending upon the nature of the fault. In response to the reduction of voltage, the positive symmetrical components of network voltage decrease and the voltage-responsive relay 9 drops out to interrupt the restraining connections. The relay 5 now operates with maximum sensitivity, and in response to the reverse power flow, operates to cause engagement of the movable contact member 5c and the tripping contact member 5a.

In response to engagement of the contact members 5c and 5a, the shunt trip coil 4a is energized and the circuit breaker 4 trips open.

Assuming that the network 2 is now energized by other transformer banks not shown, the potential windings 12 of the relay 5 and 7b of the relay 7 remain energized. As soon as the feeder breaker (not shown) opens to disconnect the feeder 3 at the supply end, the voltage of the network 2 is impressed on the circuits of the phasing windings 10. The phasing windings 10 now co-operate with the potential windings 12 to produce a strong torque which maintains the movable contact member 5c in engagement with the tripping contact member 5a. The over-voltage adjusting loops 13 also produce a torque which tends to maintain the movable contact member 5c in engagement with the tripping contact member 5a until normal voltage of the transformer bank 1 is restored. Similarly, the contact members of the phasing relay 7 are firmly held in the open position.

When the fault on feeder 3 has cleared or the feeder has been repaired, and the feeder voltage has been restored, the phase-sequence filter 8 is subject to a system of polyphase voltages consisting of two phases of transformer secondary voltage and one phase of network voltage. When the positive symmetrical components of this system exceed 95% of normal value, the voltage-responsive relay 9 closes to establish restraining connections to the relay 5. It will be understood that this condition occurs when the three voltages applied to the phase-sequence network 8 are of approximately normal value and are displaced by approximately 120° in phase position.

Because of the biasing or restraining torque produced in the relay 5, the movable contact member 5c engages the closing contact member 5b. If the transformer secondary voltage and the network voltage are now of proper magnitude and phase position to cause closure of the phasing relay 7, the circuit of closing relay 6 is completed and a closing operation of the circuit breaker 4 is initiated.

It will be noted that in this operation, the comparison of magnitudes of transformer secondary voltage and network voltage is made by the phase-sequence filter 8 and voltage-responsive relay 9 rather than the power directional relay 5. As the relay 9 permits closure of the circuit breaker 4 when the polyphase voltage of the transformer bank 1 may be below normal by as much as 5%, there may be a reverse power flow upon closure of the circuit breaker 4. However, as the restraining torque of relay 5 is applied before the circuit breaker 4 closes, the initial flow of reverse power is, in the majority of instances, insufficient to cause a tripping operation.

Fig. 2 shows a modification of the protector shown in Fig. 1, in which the phase-sequence filter 8 acts in the same manner as in Fig. 1, and the power-directional relay 5 performs the function of the phasing relay 7 of Fig. 1, thereby avoiding the use of a separate phasing relay.

Referring to Fig. 2, the transformer bank 1 is energized from the feeder 3 and connected to the distribution network 2 by the circuit breaker 4 as in Fig. 1. The power directional relay 5 is of the same type as heretofore considered and is provided with phasing windings 10, current windings 11 and potential windings 12, overvoltage adjusting loops 13 and a spring 5d as in Fig. 1.

The potential windings 12 are connected in star to the network 2, and the current windings 11 are energized by current transformers 14 as in Fig. 1. The phasing windings 10 are connected in series with phasing reactors 15a rather than resistors, across the main contact members of the circuit breaker 4.

An undervoltage relay 25, for which there is no equivalent in Fig. 1, is provided for insuring closure of the circuit breaker 4 when the network 2 is dead. The undervoltage relay 25 is energized from a phase of the network 2 and connects one terminal of the phase-sequence filter 8 to a conductor of the network 2 when the latter is energized, or to the corresponding terminal of the transformer bank 1 when the network 2 is dead.

The closing contact member 5b of the power-directional relay 5 is connected to a second terminal of the phase-sequence filter 8, and the remaining terminal of the phase-sequence filter 8 is connected to the corresponding secondary terminal of transformer bank 1.

The voltage-responsive relay 9 is provided with auxiliary contact members 9b for controlling the closing circuit of the circuit breaker 4. The trip circuit of the circuit breaker 4 is controlled in the same manner as in the other figures.

The restraining circuits, which include the restraining resistors 16 have been shown in somewhat modified form in Fig. 2. In Fig. 2, the voltage-responsive relay 9 is provided with a set of contact members for connecting each restraining circuit to ground rather than to an artificial neutral point. It will be understood that this arrangement is the full equivalent of that shown in Fig. 1 and may be used interchangeably therewith.

The operation of the apparatus shown in Fig. 2 may be set forth as follows: It is assumed that initially the feeder 3 and network 2 are deenergized and the various relays and switches are in the positions shown in the figure. The movable contact member 5c of the relay 5 is held in engagement with the closing contact member 5b by the spring 5d. As undervoltage relay 25 is deenergized, the phase-sequence filter 8 is connected to the secondary terminals of transformer bank 1.

If the feeder 3 is first energized, the phase-sequence filter 8 is energized therefrom, and assuming normal voltage conditions, the voltage responsive-relay 9 closes to complete the closing circuit of circuit breaker 4 and to complete restraining connections for the power-directional relay 5. The circuit breaker 4 now closes.

The opening operation of the circuit breaker 4 in response to faults on the feeder 3 is the same as that described in connection with Fig. 1.

The closing operation of the circuit breaker 4 when both the feeder 3 and the network 2 are energized is as follows. Because of energization of the network 2, the undervoltage relay 25 is closed, under the assumed conditions, and the potential windings 12 of the relay 5 are energized. The over-voltage adjusting loops 13 accordingly produce a biasing torque which maintains the movable contact member 5c of the relay 5 out of engagement with the closing contact member 5b.

Because of the phasing reactors 15a, the power-directional relay 5 operates with rotated closing characteristics similar to those of a phasing relay. When the transformer secondary voltage bears a suitable relationship to the network voltage for closure of the relay 5, for example when the transformer secondary voltage leads the network voltage, the relay 5 closes to complete a circuit for the phase-sequence filter 8.

The phase-sequence filter 8 is now energized by a system of voltages consisting of two phases of transformer secondary voltage and the third phase of network voltage. As described in connection with Fig. 1, the voltage-responsive relay 9 closes when the voltages applied to phase-sequence filter 8 are of approximately normal value and displaced by approximately 120°. Upon closure of the voltage-responsive relay 9, the circuit breaker 4 closes and restraining connections for the relay 5 are completed as described above.

Fig. 3 shows a simplified application of my invention to a circuit breaker provided with power-directional direct-trip devices of the type described in my copending application Serial No. 736,022, filed July 19, 1934, and assigned to the Westinghouse Electric & Manufacturing Company.

Referring to Fig. 3 in detail, the transformer bank 1, network 2, feeder 3, phase-sequence voltage filter 8, voltage-responsive relay 9 and relay 25 are similar to the corresponding elements described in connection with the other figures. A lockout relay 26 is provided for preventing reclosure of the network circuit breaker, after an opening operation, until the feeder 3 has been entirely deenergized and then re-energized. The lockout relay 26 is voltage responsive, and is designed to drop out at a comparatively small voltage, such as 10% of normal phase-to-phase voltage, and to reclose at a higher voltage, such as 60% of normal phase-to-phase.

A network circuit breaker, preferably of specialized construction is indicated diagrammatically at 30. The circuit breaker 30 is constructed with individual poles 30a, 30b and 30c for the separate phases, each arranged to be independently tripped open. Separate springs 31a, 31b and 31c are provided for opening the individual poles 30a, 30b and 30c, respectively, when the toggles have been moved beyond the dead center positions. A mechanical lost motion connection 32, however, is provided for initiating the tripping of the two remaining poles, when any of the poles 30a, 30b or 30c has been moved beyond the dead center position. In this way, the tripping of all the poles is effected when any pole is tripped, although the initial latch load required to trip the entire breaker corresponds to that of a single pole only.

Individual direct trip devices 32a, 32b and 32c, of the type described in my copending application, Serial No. 736,022, mentioned above, are provided for initiating the tripping of the individual poles in response to a reverse power condition, or vector product of current and voltage, above a predetermined value in the corresponding phase. The direct trip devices 32a, 32b and 32c are designed so that their armatures move from a normally stable initial position through an unstable range, upon operation, to thereby deliver a considerable amount of mechanical energy to the circuit breaker toggles. A set of lost motion trip rods 33 are provided for transmitting the tripping impulses of direct-trip devices 32a, 32b and 32c to the corresponding poles 30a, 30b and 30c, respectively.

The construction and connections of the direct trip devices 32a, 32b and 32c are described in detail in my application Serial No. 736,022, mentioned above. The magnetic circuits are preferably built around the main circuit conductors to provide current energization, and voltage energization is provided by voltage winding means indicated diagrammatically at 34. The voltage winding means 34 are energized in circuits which include series impedances 35, and preferably, also, saturable shunt reactances 36. Obviously, by varying the constants of the impedances 35 and 36, the tripping characteristics of the direct-trip devices may be varied over a wide range, and it will be assumed that the impedances 35 and 36 are chosen to give a high reverse current setting.

The circuit breaker 30 is provided with a closing solenoid 37, operable to close all of the poles 30a, 30b and 30c as a unit. The solenoid 37 is arranged to be energized by means of direct current furnished by a set of rectifiers 38, upon closure of the voltage-responsive relay 9. The circuit breaker 30 is also provided with the usual front auxiliary contacts 39 and back auxiliary contacts 40.

The relay 26 is connected in an energizing circuit which may be traced from the upper or a-phase secondary conductor of the transformer bank 1, through the front auxiliary contacts 39 of circuit breaker 30 and the operating coil of relay 26 to the lower or c-phase secondary conductor of transformer bank 1. The front contacts 26a of relay 26 are connected in parallel to the contacts 39 of circuit breaker 30, in order to establish a holding circuit for relay 26 independent of the contacts 39.

The closing solenoid 37 is connected in a closing circuit extending from the a-phase secondary conductor of transformer bank 1, through the back contacts 40 (shown open) of circuit breaker 30, a branch of the rectifier 38, the closing solenoid 37, a second branch of the rectifier 38, and through the contacts of relay 9 to the lower or c-phase secondary conductor of the transformer bank 1.

The elements of Fig. 3 are shown in the positions they assume when the transformer 1 is supplying power to the network 2, and voltage conditions are normal.

The operation of the apparatus shown in Fig. 3 is as follows: If a fault occurs on the feeder 3 one or more of the direct trip devices 32a, 32b and 32c operate to open the circuit breaker 30. However, the lockout relay 26 remains closed as long as there is voltage on the feeder 3. When all other protectors connected to the feeder 3 have opened, and, of course, the feeder breaker (not shown) has opened, the lockout relay 26 drops out to connect the voltage-responsive relay 9 to the voltage filter 8. As the reactance of the transformer bank 1 is interposed in the path of any current flowing from the network 2 to a fault on the feeder 3, the voltage available for the lockout relay 26 remains considerably above the dropout value of 10%, even in the event of a severe feeder fault, until the feeder is entirely deenergized.

When the feeder voltage is restored, the voltage filter 8 and relay 9 operate to initiate a closing operation when the positive symmetrical components of a system of voltages consisting of two feeder phases and one network phase exceeds 95% of the normal value, as in Fig. 1. Upon closure of the circuit breaker 30, the lockout relay 26 recloses and completes a holding circuit for itself through contacts 26a. The relay 25 provides for closure of the circuit breaker 30 in the event of deenergization of the network 2, as in Fig. 2.

Although various elements used in the practice of my invention have been described in some detail, it will be understood that only such methods, and combination of parts as are specifically defined in the appended claims constitute the present invention.

I do not regard the specific circuit breaker construction described in connection with Fig. 3 as my invention, as that is the invention of T. Lindstrom, covered in a copending application, Serial No. 744,506, filed September 18, 1934, and assigned to the Westinghouse Electric & Manufacturing Company.

I do not regard the combination of the voltage filter 8, voltage-responsive relay 9 and lockout relay 26, disclosed in Fig. 3 as my invention, as that is covered in the copending application of J. S. Parsons and R. E. Powers, Serial No. 726,575, filed May 19, 1934, and assigned to the Westinghouse Electric & Manufacturing Company.

I do not regard any specific element, structure, system of distribution or control system herein disclosed as part of the present invention, except such as are specifically claimed in the present application, or which may be hereafter specifically claimed in divisional or continuing applications based upon the present disclosure.

It is not intended, however, that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. The method of establishing connections between a pair of polyphase alternating-current circuits of the same number of phases, which comprises producing an effect dependent upon a polyphase system of voltages having the same vector dimensions as the polyphase voltages of said circuits and including at least one voltage derived from each of said circuits, and connecting said circuits when said effect corresponds to a normal polyphase relationship of said system of voltages.

2. The method of establishing connections between a pair of three-phase alternating-current circuits which comprises producing an effect dependent upon a first voltage phase of one of the circuits and a second and a third voltage phase of the other circuit, and connecting said circuits when said effect corresponds to a normal relationship of said first, second and third voltage phases.

3. The method of establishing connections between a pair of three-phase alternating-current circuits which comprises producing an effect dependent upon a positive symmetrical component of a polyphase voltage system comprising a first voltage phase of one of the circuits and a second and a third voltage phase of the other circuit, and connecting the circuits when said effect corresponds to a positive symmetrical component above a predetermined value.

4. The method of establishing connections between a pair of polyphase alternating-current circuits of the same number of phases having a single conductive connection of common potential, which comprises producing an effect dependent upon a single polyphase system of voltages derived from both of said circuits jointly through said common connection and having the same vector dimensions as the polyphase voltages of said circuits, and connecting said circuits when said effect corresponds to a normal polyphase relationship of said system of voltages.

5. In an automatic protector for controlling a connection between a polyphase alternating-current feeder circuit and a polyphase alternating current load circuit, means responsive to the magnitudes of a polyphase system of voltages comprising at least one phase voltage derived from said feeder circuit and one phase voltage derived from said load circuit for causing said circuit breaker to close in response to a predetermined condition dependent upon the magnitudes of said voltages, and means selectively responsive to a fault on said feeder circuit for causing said circuit breaker to open.

6. In an automatic protector for controlling a connection between a polyphase alternating-current feeder circuit and a polyphase alternating-current load circuit, means responsive to the phase relationship of a polyphase system of voltages comprising at least one phase voltage derived from said feeder circuit and one phase voltage derived from said load circuit for causing said circuit breaker to close in response to predetermined conditions dependent upon the phase relationship of said voltages, and means selectively responsive to a fault on said feeder circuit for causing said circuit breaker to open.

7. In combination, a first polyphase alternating-current circuit, a second polyphase alternating-current circuit, a circuit breaker for connecting said circuits, means for segregating a positive symmetrical component of a polyphase system of voltages comprising at least one phase voltage derived from said first circuit and at least one phase voltage derived from said second circuit, and means responsive to said positive component for causing said circuit breaker to close when the voltages of said system are of substantially normal absolute value and phase relationship.

8. In an automatic protector for controlling the connection and disconnection of a polyphase alternating-current supply circuit and a polyphase alternating-current load circuit, a circuit breaker, means responsive to a symmetrical component of a polyphase system of voltages comprising at least one phase voltage derived from said supply circuit and at least one phase voltage derived from said load circuit for causing said circuit breaker to close when the voltages of said system are of substantially normal absolute value and phase relationship, and power-directional direct-trip means for causing said circuit breaker to open.

9. In an automatic protector for controlling the connection and disconnection of an alternating-current supply circuit and an alternating-current load circuit, a circuit breaker, means for causing said circuit breaker to close when voltages of said circuits are of substantially normal absolute value and are in substantially normal phase relationship, and means for causing said circuit breaker to open in response to predetermined voltage and reverse current conditions of said circuits and for preventing closure of said circuit breaker when said voltages are of such relationship that reverse current would flow upon closure of said circuit breaker under average impedance conditions of said load circuit.

10. In an automatic protector for controlling the connection and disconnection of an alternating-current supply circuit and an alternating-current load circuit, a circuit breaker, means for causing said circuit breaker to close when voltages of said circuits are of substantially normal absolute value and are in substantially normal phase relationship and power-directional means for causing said circuit breaker to open in response to predetermined voltage and reverse current conditions of said circuits and for preventing closure of said circuit breaker when said voltages are of such relationship that reverse current would flow upon closure of said circuit breaker under average impedance conditions of said load circuit.

11. In an automatic protector for controlling the connection and disconnection of a polyphase alternating-current supply circuit and a polyphase alternating-current load circuit, a circuit breaker, mechanism for effecting the opening and closing of said circuit breaker, means responsive to a symmetrical component of a system of polyphase voltages comprising at least one phase voltage of said supply circuit and at least one phase voltage of said load circuit for controlling said mechanism to cause said circuit breaker to close when the voltages of said circuits are of substantially normal absolute value and are in substantially normal phase relationship and power-directional means for controlling said mechanism to cause said circuit breaker to open in response to predetermined voltage and reverse current conditions of said circuits and for preventing closure of said circuit breaker when the voltages of said circuits are of such relationship that reverse current would flow upon closure of said circuit breaker under average impedance conditions of said load circuit.

MYRON A. BOSTWICK.